Figure 1:
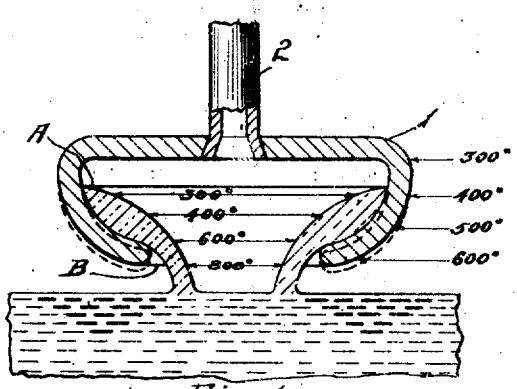

A. E. SPINASSE.

METHOD OF DRAWING GLASS CYLINDERS.

APPLICATION FILED FEB. 2, 1916.

Reissued Mar. 7, 1916. 14,082.

WITNESS:

J. A. Kendig

INVENTOR.

Eugene E. Spinasse

By Fuselrad Bradley Lechner & Fraker

ATTORNEYS.

UNITED STATES PATENT OFFICE.

ARTHUR E. SPINASSE, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

METHOD OF DRAWING GLASS CYLINDERS.

14,082. Specification of Reissued Letters Patent. Reissued Mar. 7, 1916.

Original No. 1,085,066, dated January 20, 1914, Serial No. 767,623. Application for reissue filed February 2, 1916. Serial No. 75,834.

*To all whom it may concern:*

Be it known that I, ARTHUR E. SPINASSE, a citizen of the United States, residing at Mount Vernon, in the county of Knox and State of Ohio, have invented certain new and useful Improvements in Methods of Drawing Glass Cylinders, of which the following is a specification.

My invention relates to the art of drawing glass cylinders or rollers, as they are known in the art, and may be aptly characterized a method of drawing glass cylinders. While it is a method of drawing glass cylinders, it is more exactly a method of using a particular form of bait, which may be called a pocket-bait. The meaning of this term will be more clear by reference to my patent numbered 921,747, which shows and contains claims upon a pocket bait. My present invention is a method of use of a bait of this type, wherein there is provided a pocket adapted to receive and retain the initial portion of a cylinder to be drawn.

The primary purpose of this method is the production of an initial portion of the cylinder to be drawn which initial portion will well support the cylinder from the bait throughout the drawing action and in a manner such that breakage of the initial portion of the cylinder will be precluded.

Because the result to be attained may not be readily reached and because the attainment is fraught with many difficulties which have, I believe, never been plainly apparent to the many prior intelligent inventors, I deem it necessary to here state the basic causes of these difficulties, since in no other way can the importance of my invention be realized. I, therefore, here state the broad principles which have hitherto been ignored, with failure as a result, and upon which my invention is founded, with success as a result. The bait, usually of metal, is dipped in a molten glass bath to gather the initial portion of the cylinder and is then withdrawn and slowly elevated, the elevation being accompanied by the introduction of air to the center of the gather to expand it to cylindrical form. This is apparently a simple operation. The difficulty primarily arises from the fact that there necessarily results either a band of metal surrounding a body of glass or vice versa, these two materials of course having different coefficients of expansion. Of almost equal importance is the fact that one material is giving up while the other is absorbing heat and, furthermore, the giving up and the absorption cannot be the same or uniform in different parts of the materials. To illustrate, if the material of the bait and the glass had the same coefficients of expansion and were uniformly heated at all points, they would expand and contract equally and in harmony at all points. But we at once face the fact that there is no material known which has a coefficient of expansion the same as that of glass. Another fact of equal importance is also apparent, that it is practically impossible to attain and maintain a uniform heating throughout the drawing operation. At this point it may be well that we remember the extreme importance of even minute variations of form, in the handling of this brittle glass before it is annealed. Ample reason for the lack of uniformity in heating appears from the fact that the surface of the glass at a drawing temperature is in the neighborhood of 1500 degrees, while the substrata increase in temperature with their depth until a certain depth is reached. With any ordinary metal, the bait must initially be at a lower temperature than the glass. It follows that there will result an interchange of heat between the glass and the bait during the draw, the glass yielding up its heat and contracting, while the bait absorbs heat and expands, up to a certain point. At some time, probably during the expansion of the bait, the gather sets to permanent form and continues to cool and probably to slightly shrink. The bait may continue to expand and probably will, but it will ultimately contract and return to normal position. These expansions and contractions of the glass and the bait relatively are not only irregular in relation to each other, but the glass may contact more at one point than at another during a certain period and the bait may expand or contract more at one point than at another during a certain period. The variant expansion of the bait at different points is especially pronounced in certain types of baits, although it is apparently inevitable to some extent in all types.

My invention consists in a method of avoiding conflicts which would ordinarily arise from the above conditions in the drawing of glass cylinders. It aims to produce a cylinder whose initial portion is supported in easy relation by the bait. Specifically stated, my method produces an initial portion of the cylinder which is supported by the bait without being fused thereto and which is shaped in anticipation of the variation of the form of the bait under heat influences, so that rupture will not result from such variation of form. Fusion of the bait and glass surfaces should be avoided because, in the expansive and contractive changes of form, necessarily different in the two materials with their different coefficients, such fusion must inevitably result in rupturing stresses. This is the first portion of my method. Then, in the second portion, the novel should be given a definite shape in relation to the bait, or direct rupturing pressures will arise.

My invention relates, as stated, to a pocket-bait and has for its object the production of a novel supported in the bait pocket without fusion and properly shaped to avoid rupturing pressures of a direct nature. My method of use of this pocket-bait comprises two steps. The first step is the use of the bait comparatively cold to produce a plastic novel which is well supported in the pocket of the bait but without fusion to the walls of such pocket. The second step consists in permitting the novel to set naturally to external permanence of form and size before the cylinder-producing air is introduced through such novel. Many equivalents are possible. For instance, instead of using the bait cold, it may be possible to use a graphite of some kind; or, instead of permitting the novel to completely set before blowing, it may be possible and advisable to blow with very slight pressure before the novel has fully set. In the first instance, it is the end—a non-fused novel—that is sought. In the second instance, it is the proper shape. I claim the right to equivalents.

In specifying that the bait should be used comparatively cold, I mean that the bait at the time of insertion should be at a temperature probably less than 200 degrees F. in contradistinction to the custom, hitherto prevalent, of using the bait at a temperature of approximately 800 degrees F. Of course circumstances may alter this temperature.

Figure 2:
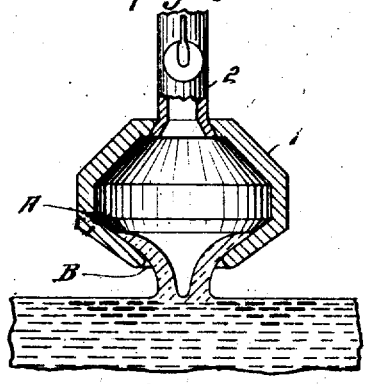
Figure 3:
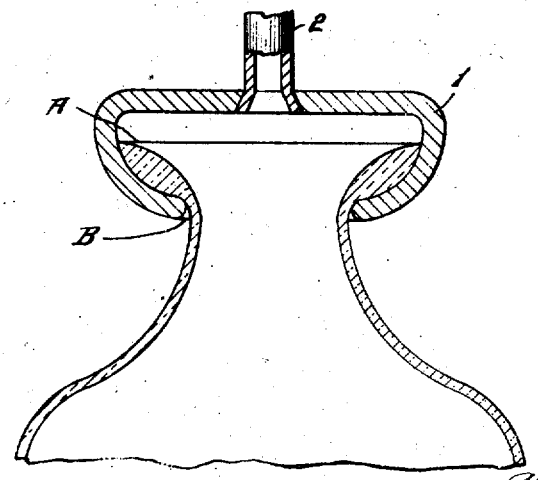

I have considered it advisable to utilize drawings in the explanation of my invention and, in these drawings, Figure 1 is a vertical section of a bait and novel with indications of the temperatures existing at the different points, it being understood that these temperature indications are not true but are merely illustrative of the different temperature conditions at different points on the bait and novel and showing relative conditions. Fig. 2 is a vertical section of a bait and novel wherein the bait is being held near the surface of the glass bath until its external contour becomes practically unalterable. It will be understood that this may be accomplished in other ways, as by drawing slowly. Fig. 3 is a vertical section of a bait and the initial portion of the cylinder, showing the relation of this initial portion of the cylinder to the bait.

In the drawings, I have shown one form of pocket-bait, which may be utilized, as comprising a body carried by a pipe 2. The bait has been used comparatively cold, as stated above, and has been dipped in the bath to gather the glass, although the glass might be gathered by suction. From the moment the bait approaches the surface of the glass batch, it commences to absorb heat and the glass in immediate subjection thereto commences to lose heat. This interchange of heat is necessarily more pronounced during and after dipping. As the novel contracts with the cooling the upper end thereof settles back. In the use of the form of bait shown in Fig. 2, it is particularly necessary to limit the height of the novel on its supporting surfaces. By reference to Fig. 1 of the drawings, it will appear that this upper end of the bait will be the coolest point during the drawing operation, it being apparent independently of the drawings that such upper end of the bait is the least subject to heat influences. Therefore, this portion of the bait and novel which may be designated A is the least subject to the dangers of conflicting contractions and expansions.

The real danger zone of the operation may be indicated approximately by B and this will be understood by a comparison of the temperatures of the bait and the novel at this point, or by contemplation of the fact that this part of the bait is the first part to enter and the last part to leave the hot glass bath. Not only does the bait expand more at this point but the novel is, particularly in the initial stage of the drawing, variable as to form under the slightest influences. The expansion of the bait in the neighborhood of the zone B is represented by the dotted lines in Fig. 1. Now though the bait expands to such an extent, it must not be forgotten that the contraction is substantially equal. To illustrate the danger, let it be supposed that the bait has started to expand and will have a total expansion of one-sixteenth of an inch. After one half of the expansion has taken place, or, to put it another way, after the bait has expanded one-thirty-second of an inch, suppose the blowing of the cylinder is initiated in the normal way. The novel, which is still very sensitive particularly at B, will be expanded so that this portion B will be blown into contact with the orificial wall of the bait. Then, suppose the novel sets at this point. The bait will continue to expand for another thirty-second of an inch. Then, contraction of the bait will set in and the bait will ultimately contract to its normal size, or very nearly so. At any rate, the bait will ultimately contract to a smaller size than the set novel. This must result in the crushing of the novel. The second step of my invention eliminates this last-described danger by attaining such a shape of novel that the variations of the bait and novel do not conflict, at least to any material extent. By way of reiteration, this second step consists in permitting the novel to naturally set to external permanence of form before blowing. My method, then, consists in using the bait cold or in such a state as to produce a non-fused novel and permitting such novel to naturally set to external permanence of form before blowing. It will be apparent that the novel must be non-fused or the second step of the process will be useless. It will be equally apparent that the novel must be permitted to set naturally before blowing or the process will be incomplete. The two steps are necessary and inseparable in the present process.

In this application, the word "novel" has been used to denote both the portion which is in actual contact with the bait and the neck which connects this portion with the cylinder. The word "naturally" means that state wherein the neck of the novel or any portion thereof will not be forced into dangerous proximity to any abrupt wall of the bait. This forcing might occur either because of the form of the bait or by its accessory elements or by the air. Figs. 2 and 3 are particularly presented to show the desirable clearance attained at B by my method. "Permitting to set to an external permanence of contour" embraces immaterial variations, it having been made clear that the object is to avoid dangerous proximity of abrupt walls of the bait and the novel.

Having thus described my invention, what I claim as new and desire to secure by Letters Patent, is:

The method of drawing glass with a bait having a novel supporting pocket, which consists in using the said bait cold to procure the novel consisting of a flange and depending neck in the pocket, forming the novel with room for movement at the free edge of said flange and with the neck portion of the novel spaced away from the orificial wall of the pocket, permitting the said flange and neck to externally set to this form and then blowing after such setting.

ARTHUR E. SPINASSE.